H. P. KRAFT.
DUST CAP FOR TIRE VALVES AND THE LIKE.
APPLICATION FILED DEC. 17, 1914.
1,401,541.
Patented Dec. 27, 1921.
2 SHEETS—SHEET 1.
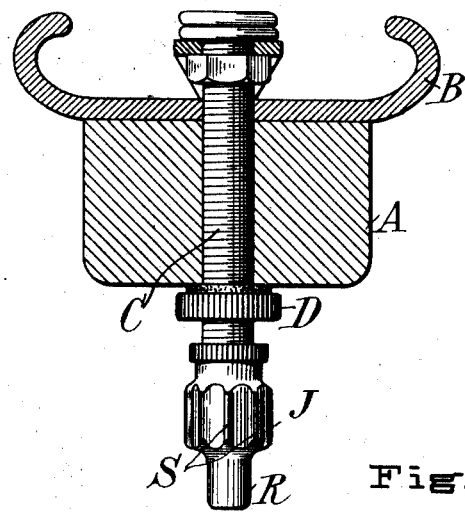
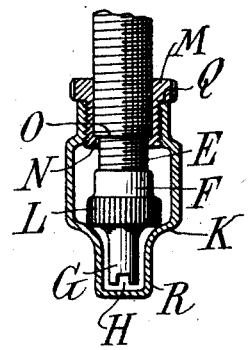
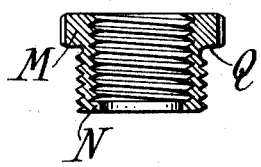
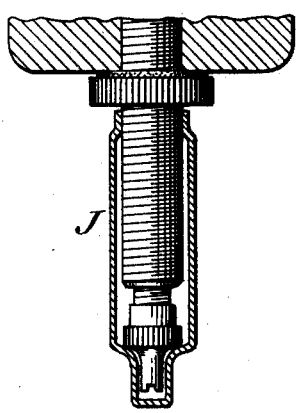
INVENTOR:
Henry Phillip Kraft,
By Attorneys,
WITNESSES:

H. P. KRAFT.
DUST CAP FOR TIRE VALVES AND THE LIKE.
APPLICATION FILED DEC. 17, 1914.

1,401,541.

Patented Dec. 27, 1921.
2 SHEETS—SHEET 2.

WITNESSES:

INVENTOR:
Henry Phillip Kraft,
By Attorneys,

UNITED STATES PATENT OFFICE.

HENRY PHILLIP KRAFT, OF RIDGEWOOD, NEW JERSEY.

DUST-CAP FOR TIRE-VALVES AND THE LIKE.

1,401,541.  Specification of Letters Patent.  Patented Dec. 27, 1921.

Application filed December 17, 1914. Serial No. 877,789.

*To all whom it may concern:*

Be it known that I, HENRY PHILLIP KRAFT, a citizen of the United States of America, residing at Ridgewood, in the county of Bergen and State of New Jersey, U. S. A., have invented certain new and useful Improvements in Dust-Caps for Tire-Valves and the like, of which the following is a specification.

This invention relates to dust caps for tire and other valves, and aims to provide certain improvements therein. The common form of tire valve comprises a casing extending through the felly of the wheel and projecting inwardly to a greater or less degree, depending on the thickness of the felly with which it is used. The valve mechanism is usually located wholly within the casing, and the outer end of the casing is provided with a valve cap which is customarily formed with a central projection designed to engage the valve mechanism for the purpose of removing it from the casing or restoring it therein. It is also customary to provide a dust cap which screws over the projecting part of the valve casing for the purpose of excluding dust and moisture, and protecting the casing. Such caps are customarily made of a length sufficient to inclose the projecting end of the valve casing with the ordinary fellies employed, but if the felly is much reduced in thickness, the correspondingly large part of the casing projects, and it occasionally happens that the closed end of the dust cap will engage the valve cap before the dust cap is seated against the felly. Under these circumstances the dust cap is apt to become perforated, and the valve cap is apt to be injured.

According to the present invention, I provide a dust cap having a means for preventing it from being screwed past the danger point, so that neither the dust cap nor the valve cap can be injured. Such means preferably comprise engaging portions on the dust cap and valve, and by preference the dust cap is formed with a shoulder which engages the body of the valve cap in such manner that the projection on the valve cap is prevented from contacting with the dust cap. The invention also includes certain other features of improvement which will be hereinafter pointed out.

Referring to the drawings which illustrate several embodiments of the invention,—

Figure 1 is a sectional view of a rim and felly showing the valve casing and dust cap in elevation.

Fig. 2 is an elevation of the end of the valve casing and a sectional view of the dust cap.

Fig. 3 is a sectional view of the dust cap on a larger scale.

Fig. 4 is a sectional view of the adjusting collar shown in Figs. 1 and 2.

Fig. 5 is an elevation of a part of the valve casing and felly showing a slightly different form of cap.

Figure 6:
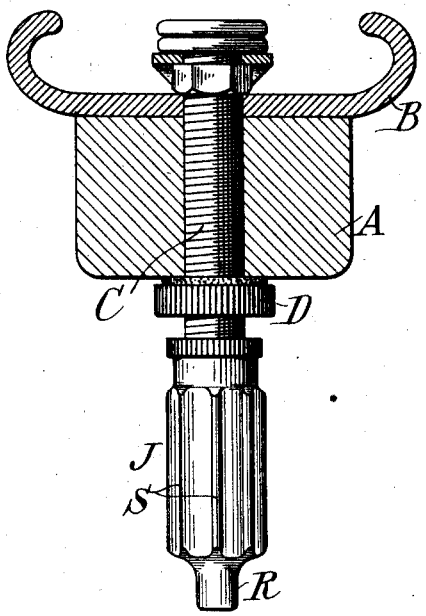
Fig. 6 is a view similar to Fig. 1, showing another modification.

Referring to the drawings, let A indicate a wheel felly of common construction, and B a form of metal rim adapted to engage the tire. C indicates the common form of pneumatic tire valve which is screw-threaded throughout its length and is some times provided with a rim nut D adapted to clamp the valve casing in place. By reference to Fig. 2 it will be seen that the valve casing is usually reduced in diameter at its outer end, as indicated at E, the reduced portion or nipple being also screw-threaded to receive the valve cap F. The valve cap is customarily formed with a central reduced projection G provided with screw driver notches H adapted to be inserted in the valve casing for the purpose of unscrewing the valve mechanism (not shown) or screwing it into place.

According to the present invention, I provide an improved dust cap J which is adapted to screw over the projecting end of the valve casing and prevent to a large extent the entrance of dust and moisture upon and around the valve cap F, so that this portion of the valve is kept clean, and the valve cap is protected from accidental injury. The invention provides a construction in which the dust cap and valve casing are provided with interengaging means which will limit the screwing-on movement of the dust cap in such a manner as to avoid contacting the projection G with the end of the dust cap. This is preferably accomplished by forming a shoulder such as K on the interior of the dust cap, which is adapted to contact with the body portion L of the valve cap, the shoulder being so located that it engages the body portion before the projection G can engage the end of the cap. Such engagement is not injurious to the dust cap or valve cap, since the shoulder of the dust cap and body portion of the valve cap are sufficiently strong and large to avoid any damage. At the same time any strain or wear is removed from the screw driver end of the valve cap.

The dust cap may screw directly upon the valve casing, as illustrated in Fig. 5, and this construction may be followed where a dust cap is constructed for a certain size of valve casing. Such casings however, are manufactured in different sizes, and the invention provides a means for permitting the use of one size of dust cap upon such different sizes of valve casings. In Fig. 2 such means are illustrated as an adjusting sleeve M which is interiorly threaded, and which is adapted to screw upon the valve casing. Preferably, the sleeve M is formed with an internal shoulder N which is adapted to engage the shoulder O on the valve casing so as to limit the onward movement of the sleeve. The exterior of the sleeve is also screw-threaded to receive the dust cap. The sleeve may also constitute a means for limiting the onward movement of the dust cap. This may be easily accomplished by providing a shoulder Q on the sleeve, which is adapted to be engaged by the inner end of the dust cap, as shown in Fig 2.

When the dust cap is made of sheet metal, it is preferable to form it with a reduced outer end R sufficient in diameter however, to easily pass over the projection G of the valve cap.

Figure 7:
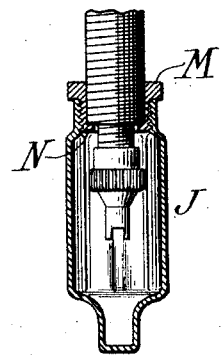
Fig. 7 is a sectional view of Fig. 6.
Figure 8:
Fig. 8 is a view partly in elevation of the dust cap of Fig. 7.

In Figs. 6 to 8 the dust cap is shown as elongated and as applied to a valve which projects very slightly form the felly. If the valve is small, the adjusting sleeve M may be employed, as in Figs. 1 and 2.

Figure 9:
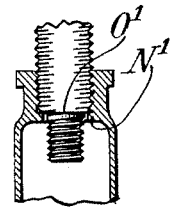
Fig. 9 is a view of another modification.

If desired, the cap and sleeve M may be formed in one piece, as shown in Fig. 9, in which case the shoulder N' is adapted to engage the shoulder O' and constitute a means for stopping the onward movement of the dust cap.

In the use of dust caps, particularly when they may be covered with oil or moisture, it is some times difficult to screw and unscrew them. To facilitate these operations I provide a cap in which are formed a series of ribs S. When the dust cap is constructed of sheet metal, these ribs are drawn in the sides thereof and constitute a very effective hand hold for the cap, being superior to the ordinary knurling commonly employed. Preferably, the ribs extend over a large portion of the body of the cap so as to increase the effective gripping surface. These ribs also act to reinforce the body of the dust cap, which reinforcement is of special importance in dust caps made from sheet metal.

While I have shown and described several embodiments of the invention, it is understood that I do not wish to be limited thereto, as various changes may be made therein without departing from the invention.

What I claim is:

1. The combination of a valve casing having a nipple and a dust cap adapted to pass freely over said nipple, said dust cap and valve casing having an engaging means for holding the cap in place on the valve casing, said dust cap and valve casing having abutting means at the inlet end of the casing for preventing the onward movement of the cap beyond a fixed point prior to the cap reaching the limit of movement otherwise permitted by the engaging means, the engaging means on the casing otherwise permitting further movement of the cap.

2. The combination of a valve casing having a nipple and a dust cap adapted to pass freely over said nipple, said dust cap and valve casing having an engaging means for holding the cap in place on the valve casing, said dust cap and valve casing having abutting means at the inlet end of the casing for preventing the onward movement of the cap beyond a fixed point prior to the cap reaching the limit of movement otherwise permitted by the engaging means, the engaging means on the casing otherwise permitting further movement of the cap, said means comprising a part on the valve casing, and a part on the dust cap.

3. A dust cap having means at its open end adapted to hold it in place on a valve casing and having its closed end adapted to freely inclose the valve nipple, and said dust cap having an internal shoulder adapted to engage a shoulder on the valve casing to limit the onward movement of the cap.

4. A dust cap having means at its open end adapted to hold it in place on a valve casing and having its closed end adapted to freely inclose the valve nipple, and said dust cap having an internal shoulder adapted to engage the body of a valve cap to limit the onward movement of the cap.

5. A dust cap having a screw-threaded portion at its inner end for engagement with a valve casing or the like and an internal shoulder at its outer end to engage a shoulder on a part connected with the casing to limit the onward movement of the dust cap.

6. A dust cap having a sleeve adapted to screw on a valve casing, said sleeve having means for engaging the casing to limit its onward movement.

7. A dust cap having a removable sleeve, said sleeve having means for engaging a valve casing to limit its onward movement.

8. A dust cap having a screw-threaded portion, a sleeve adapted to engage said screw-threaded portion, said sleeve having a threaded portion to screw on a tire valve, and having means for engaging the tire valve to limit its onward movement.

9. A dust cap having an internal shoulder adapted to contact with the body of a valve cap and having a screw-threaded portion, and a sleeve engaging said screw-threaded portion and adapted to screw on a tire valve.

10. A dust cap having an internal shoulder adapted to contact with the body of a valve cap and having a screw-threaded portion, and a sleeve engaging said screw-threaded portion and adapted to screw on a tire valve, said sleeve having an internal shoulder adapted to engage the tire valve to limit its onward movement.

11. A sheet metal dust cap for tire valves or the like formed of rigid material, having a series of ribs formed by bending its body portion.

12. A dust cap formed of rigid material having a body portion having an internal diameter sufficient to fit over a valve casing and having a contracted inner end formed with an internal screw-thread, and having a portion of reduced diameter projecting from its outer end adapted to freely inclose the projecting portion of a valve cap.

13. A sheet metal dust cap having a body portion of sufficient diameter to fit over a valve casing and having its lower end contracted and formed with an internal screw-thread and having its outer end formed with a contracted drawn metal portion adapted to fit over and inclose the projecting portion of a valve cap.

14. A dust cap formed of sheet metal and having a screw-threaded inner end and a projecting portion of reduced diameter at its outer end adapted to slip over and inclose the projecting portion of a valve cap, and the metal between said reduced portion and the body of said cap constituting a shoulder adapted to engage the body of a valve cap to limit the onward movement of the dust cap.

15. A dust cap for tire valves or the like formed of rigid material and having a portion provided with engaging means whereby it may be fastened over a tire valve casing, and having a series of ribs on its exterior at a portion other than the portion provided with said engaging means.

16. A dust cap for tire valves or the like formed of rigid material and having a portion provided with screw-threads whereby it may be fastened over a tire valve casing, and another portion having its interior spaced from the valve casing over which it is to be fitted and its exterior provided with a series of ribs.

17. A dust cap for tire valves or the like formed of rigid material and having a portion provided with screw-threads whereby it may be fastened over a tire valve casing, and another portion having its interior spaced from the valve casing over which it is to be fitted and its exterior provided with a series of ribs in the form of bends in the material of which the cap is formed.

18. A dust cap for tire valves or the like formed of rigid sheet material and having a portion provided with engaging means for fastening the cap in position over a tire valve casing, and having another portion having its interior spaced from the valve casing over which it is to be fitted and having ribs in the form of bends in the material of which the cap is formed, adapted to reinforce said cap.

19. A dust cap for tire valves or the like formed of rigid sheet material and having a portion provided with engaging means for fastening the cap in position over a tire valve casing, and having another portion having its interior spaced from the valve casing over which it is to be fitted and having ribs in the form of bends in the material of which the cap is formed, adapted to reinforce said cap, and to serve for facilitating the grasp of the fingers of a manipulator in forcing said cap into and out of engaging position.

20. In combination, a valve casing having external screw threads substantially the length thereof, and a reduced nipple in its inlet end, a dust cap adapted to pass freely over said nipple, and having an internal diameter greater than that of said casing, and an intermediate part between said cap and casing, and means for preventing onward movement of said cap beyond a fixed point.

21. In combination, a valve casing having external screw threads substantially the length thereof, and a reduced nipple in its inlet end, a dust cap adapted to pass freely over said nipple, and having an internal diameter greater than that of said casing, and an intermediate part between said cap and casing, and means for preventing onward movement of said cap beyond a point which would allow contact to be made between the top of the cap and the end of the casing.

In witness whereof, I have hereunto signed my name in the presence of two subscribing witnesses.

HENRY PHILLIP KRAFT.

Witnesses:
 E. G. MYERS,
 FRED WHITE.